United States Patent
Larson et al.

(10) Patent No.: US 11,884,850 B2
(45) Date of Patent: Jan. 30, 2024

(54) ADHESIVE FILM INCLUDING A (METH)ACRYLATE MATRIX INCLUDING A CURABLE EPOXY/THIOL RESIN COMPOSITION, TAPE, AND METHOD

(71) Applicant: 3M INNOVATIVE PROPERTIES COMPANY, St. Paul, MN (US)

(72) Inventors: Eric G. Larson, Lake Elmo, MN (US); Michael A. Kropp, Cottage Grove, MN (US); Matthew J. Kryger, Hudson, WI (US); Shijing Cheng, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 735 days.

(21) Appl. No.: 16/643,606

(22) PCT Filed: Sep. 14, 2018

(86) PCT No.: PCT/IB2018/057052
§ 371 (c)(1),
(2) Date: Mar. 2, 2020

(87) PCT Pub. No.: WO2019/053646
PCT Pub. Date: Mar. 21, 2019

(65) Prior Publication Data
US 2020/0208020 A1 Jul. 2, 2020

Related U.S. Application Data

(60) Provisional application No. 62/558,884, filed on Sep. 15, 2017.

(51) Int. Cl.
*C09J 7/35* (2018.01)
*F16B 15/00* (2006.01)
*C09J 11/06* (2006.01)

(52) U.S. Cl.
CPC ............ *C09J 7/35* (2018.01); *C09J 11/06* (2013.01); *F16B 15/0092* (2013.01); *C09J 2433/00* (2013.01); *C09J 2463/00* (2013.01)

(58) Field of Classification Search
CPC . C09J 7/35; C09J 11/06; C09J 2433/00; C09J 2463/00; C09J 2301/304;
(Continued)

(56) References Cited

U.S. PATENT DOCUMENTS

| 3,496,250 A | 2/1970 | Czerwinski |
| 3,597,410 A | 8/1971 | Lieske |

(Continued)

FOREIGN PATENT DOCUMENTS

| EP | 0138465 | 4/1985 |
| EP | 0193068 | 3/1986 |

(Continued)

OTHER PUBLICATIONS

Epikote™ Resin 828, Resolution Performance Products, Sep. 2002, 2 pages.
(Continued)

*Primary Examiner* — Scott R. Walshon
(74) *Attorney, Agent, or Firm* — Jeffrey M. Olofson

(57) ABSTRACT

A thermally curable adhesive film, a tape, and a method of making the tape, wherein the film includes: a crosslinked (meth)acrylate matrix; and a thermally curable, one-part epoxy/thiol resin composition incorporated within the crosslinked (meth)acrylate matrix; wherein the thermally curable, one-part epoxy/thiol resin composition comprises: an epoxy resin component comprising an epoxy resin having at least two epoxide groups per molecule; a thiol component comprising a polythiol compound having at least two thiol groups; a nitrogen-containing catalyst for the epoxy resin; and an organic acid.

17 Claims, 1 Drawing Sheet

(58) Field of Classification Search
CPC ........ C09J 163/00; C08L 63/00; C08G 59/66; C08K 5/37
See application file for complete search history.

(56) References Cited

U.S. PATENT DOCUMENTS

| | | | |
|---|---|---|---|
| 4,546,155 | A | 10/1985 | Hirose |
| 5,077,376 | A | 12/1991 | Dooley |
| 5,086,088 | A | 2/1992 | Kitano |
| 5,356,949 | A | 10/1994 | Komiyama |
| 5,430,112 | A | 7/1995 | Sakata |
| 5,464,910 | A | 11/1995 | Nakatsuka |
| 6,204,350 | B1 | 3/2001 | Liu |
| 6,653,371 | B1 | 11/2003 | Burns |
| 6,780,484 | B2 | 8/2004 | Kobe |
| 6,805,933 | B2 | 10/2004 | Patel |
| 6,835,422 | B2 | 12/2004 | Kobe |
| 6,872,762 | B2 | 3/2005 | Burns |
| 8,084,519 | B2 | 12/2011 | Okuno |
| 9,606,265 | B2 | 3/2017 | Lee |
| 2007/0096056 | A1 | 5/2007 | Takeuchi |
| 2013/0143176 | A1* | 6/2013 | Thalacker ............... A61K 6/887 433/215 |
| 2013/0165600 | A1 | 6/2013 | Chen |
| 2013/0313693 | A1 | 11/2013 | Burns |
| 2014/0045964 | A1 | 2/2014 | Marchegiani |
| 2015/0111035 | A1 | 4/2015 | Motomura |
| 2018/0215864 | A1 | 8/2018 | Weippert |
| 2020/0165490 | A1* | 5/2020 | Kryger .................. C08G 59/00 |
| 2021/0403634 | A1* | 12/2021 | Kropp ................ C08G 59/245 |

FOREIGN PATENT DOCUMENTS

| | | |
|---|---|---|
| EP | 0594133 | 4/1994 |
| EP | 0659793 | 6/1995 |
| EP | 1291390 | 3/2003 |
| GB | 1121196 | 7/1968 |
| JP | 56057820 | 5/1981 |
| JP | 61159417 | 7/1986 |
| WO | WO 99/36484 A1 | 7/1999 |
| WO | WO 2010-052823 | 5/2010 |
| WO | WO 2012-093510 | 7/2012 |
| WO | WO 2018-109617 | 6/2018 |
| WO | WO-2018229583 A1 * | 12/2018 ............. C08G 59/00 |

OTHER PUBLICATIONS

International Search Report for PCT International Application No. PCT/IB18/57052, dated Jan. 28, 2019, 3 pages.

* cited by examiner

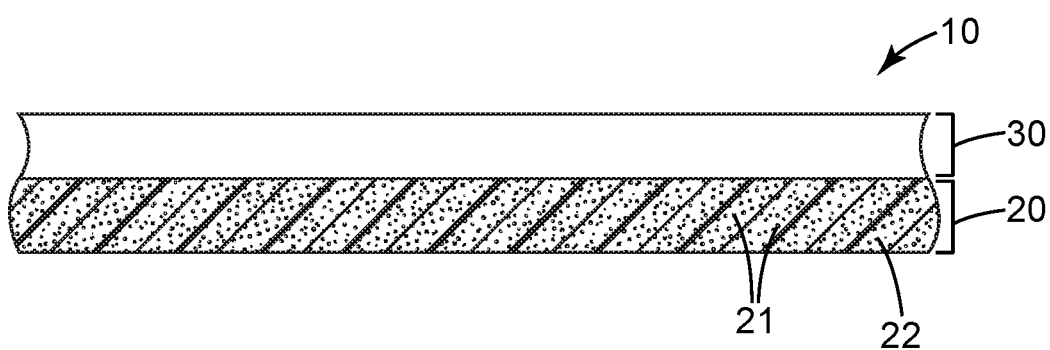

ADHESIVE FILM INCLUDING A (METH)ACRYLATE MATRIX INCLUDING A CURABLE EPOXY/THIOL RESIN COMPOSITION, TAPE, AND METHOD

CROSS REFERENCE TO RELATED APPLICATIONS

This application is a national stage filing under 35 U.S.C. 371 of PCT/IB2018/057052, filed Sep. 14, 2018, which claims the benefit of U.S. Provisional Application No. 62/558,884, filed Sep. 15, 2017, the disclosure of which is incorporated by reference in its/their entirety herein.

BACKGROUND

Curable epoxy-based compositions are well known. Such compositions are used as adhesives, coating agents, sealing agents, and casting agents. Epoxy-based compositions are also used in the electronics industry, e.g., for cell phone assembly. Epoxy/polythiol-containing compositions conventionally have been used as two-part compositions. This was due at least in part to the instability of a one-part composition that includes an epoxy resin, a polythiol curing agent, and a liquid (soluble) tertiary amine catalyst. Such one-part compositions in which the epoxy resin, polythiol, and the catalyst are admixed at room temperature typically have working or "pot" lives on the order of minutes to a few hours. These properties impose practical restrictions on end-use applications of such compositions. Accordingly, many traditional epoxy/polythiol compositions have been formulated as two-part compositions.

Commercially available latent curing agents used in one-part epoxy resin adhesive formulations ordinarily provide such formulations with a combination of good storage stability and moderate reactivity at elevated temperatures. Examples of such commercially available latent curing agents include dicyandiamide and dibasic acid dihydrazide. These curing agents are useful in formulating epoxy resin compositions with excellent storage stability; however, to achieve cure, these curing agents ordinarily require heating to temperatures greater than 150° C. for extended periods of time.

Heretofore, the desirability of balancing reactivity with pot life in curable epoxy-based compositions has been recognized. Notwithstanding the state of the art, it is desirable to provide epoxy compositions with improved storage stability at room temperature, particularly with respect to viscosity maintenance over time, as well as with extended working lives at room temperature and relatively short curing times at elevated temperatures. Furthermore, such curable compositions in film form and tape form are desirable.

SUMMARY

The present disclosure provides a thermally curable adhesive film, a tape, and a method of making the tape. The film includes a crosslinked (meth)acrylate matrix and a thermally curable, epoxy/thiol resin composition incorporated therein.

A film is provided that includes: a crosslinked (meth)acrylate matrix; and a thermally curable, one-part epoxy/thiol resin composition incorporated within the crosslinked (meth)acrylate matrix; wherein the thermally curable, one-part epoxy/thiol resin composition includes: an epoxy resin component that includes an epoxy resin having at least two epoxide groups per molecule; a thiol component that includes a polythiol compound having at least two thiol groups; a nitrogen-containing catalyst for the epoxy resin; and an organic acid. The thermally curable, epoxy/thiol resin composition is a "one-part" composition because it includes the polythiol compound, which is a curing agent, the nitrogen-containing compound, which is a catalyst, the epoxy resin, and the organic acid in admixture. In certain embodiments, the organic acid (e.g., a barbituric acid derivative, i.e., substituted barbituric acid) is soluble in the thermally curable, one-part epoxy/thiol resin composition.

An adhesive tape is provided that includes a liner and a thermally curable adhesive film as described herein.

A method of making an adhesive tape that includes a thermally curable adhesive film as described herein is also provided. The method includes: forming a coatable composition by combining components including: a (meth)acrylate resin component that includes (meth)acrylate monomers and/or oligomers, and a photoinitiator; an epoxy resin component that includes an epoxy resin having at least two epoxide groups per molecule; a thiol component that includes a polythiol compound having at least two thiol groups; a nitrogen-containing catalyst for the epoxy resin; and an organic acid; coating the coatable composition on a liner to form a photocurable coating; and photocuring the photocurable coating to form a thermally curable adhesive film disposed on the liner, wherein the thermally curable adhesive film includes a crosslinked (meth)acrylate matrix having a thermally curable, one-part epoxy/thiol resin composition incorporated therein.

The term (meth)acrylate includes acrylates and methacrylates.

The term "aliphatic" refers to C1-C40, suitably C1-C30, straight or branched chain alkenyl, alkyl, or alkynyl which may or may not be interrupted or substituted by one or more heteroatoms such as O, N, or S.

The term "cycloaliphatic" refers to cyclized aliphatic C3-C30, suitably C3-C20, groups and includes those interrupted by one or more heteroatoms such as O, N, or S.

The term "alkyl" refers to a monovalent group that is a radical of an alkane and includes straight-chain, branched, cyclic, and bicyclic alkyl groups, and combinations thereof, including both unsubstituted and substituted alkyl groups. Unless otherwise indicated, the alkyl groups typically contain from 1 to 30 carbon atoms. In some embodiments, the alkyl groups contain 1 to 20 carbon atoms, 1 to 10 carbon atoms, 1 to 6 carbon atoms, 1 to 4 carbon atoms, or 1 to 3 carbon atoms. Examples of "alkyl" groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like.

The term "alkylene" refers to a divalent group that is a radical of an alkane and includes groups that are linear, branched, cyclic, bicyclic, or a combination thereof. Unless otherwise indicated, the alkylene group typically has 1 to 30 carbon atoms. In some embodiments, the alkylene group has 1 to 20 carbon atoms, 1 to 10 carbon atoms, 1 to 6 carbon atoms, or 1 to 4 carbon atoms. Examples of "alkylene" groups include methylene, ethylene, 1,3-propylene, 1,2-propylene, 1,4-butylene, 1,4-cyclohexylene, and 1,4-cyclohexyldimethylene.

The term "aromatic" refers to C3-C40, suitably C3-C30, aromatic groups including both carbocyclic aromatic groups as well as heterocyclic aromatic groups containing one or more of the heteroatoms, O, N, or S, and fused ring systems containing one or more of these aromatic groups fused together.

The term "aryl" refers to a monovalent group that is aromatic and, optionally, carbocyclic. The aryl has at least one aromatic ring. Any additional rings can be unsaturated, partially saturated, saturated, or aromatic. Optionally, the aromatic ring can have one or more additional carbocyclic rings that are fused to the aromatic ring. Unless otherwise indicated, the aryl groups typically contain from 6 to 30 carbon atoms. In some embodiments, the aryl groups contain 6 to 20, 6 to 18, 6 to 16, 6 to 12, or 6 to 10 carbon atoms. Examples of an aryl group include phenyl, naphthyl, biphenyl, phenanthryl, and anthracyl.

The term "arylene" refers to a divalent group that is aromatic and, optionally, carbocyclic. The arylene has at least one aromatic ring. Optionally, the aromatic ring can have one or more additional carbocyclic rings that are fused to the aromatic ring. Any additional rings can be unsaturated, partially saturated, or saturated. Unless otherwise specified, arylene groups often have 6 to 20 carbon atoms, 6 to 18 carbon atoms, 6 to 16 carbon atoms, 6 to 12 carbon atoms, or 6 to 10 carbon atoms.

The term "aralkyl" refers to a monovalent group that is an alkyl group substituted with an aryl group (e.g., as in a benzyl group). The term "alkaryl" refers to a monovalent group that is an aryl substituted with an alkyl group (e.g., as in a tolyl group). Unless otherwise indicated, for both groups, the alkyl portion often has 1 to 10 carbon atoms, 1 to 6 carbon atoms, or 1 to 4 carbon atoms and an aryl portion often has 6 to 20 carbon atoms, 6 to 18 carbon atoms, 6 to 16 carbon atoms, 6 to 12 carbon atoms, or 6 to 10 carbon atoms.

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein, the term "room temperature" refers to a temperature of 22° C. to 25° C.

The term "in the range" or "within a range" (and similar statements) includes the endpoints of the stated range.

Reference throughout this specification to "one embodiment," "an embodiment," "certain embodiments," or "some embodiments," etc., means that a particular feature, configuration, composition, or characteristic described in connection with the embodiment is included in at least one embodiment of the invention. Thus, the appearances of such phrases in various places throughout this specification are not necessarily referring to the same embodiment of the invention. Furthermore, the particular features, configurations, compositions, or characteristics may be combined in any suitable manner in one or more embodiments.

The above summary of the present disclosure is not intended to describe each disclosed embodiment or every implementation of the present invention. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

BRIEF DESCRIPTION OF THE DRAWINGS

FIG. 1 is a side view of an adhesive tape 10 that includes a thermally curable film 20 of the present disclosure (that includes a thermally curable, one-part epoxy/thiol composition 21 incorporated within a crosslinked (meth)acrylate matrix 22) disposed on a release liner 30 (not to scale).

DETAILED DESCRIPTION

The present disclosure provides a thermally curable adhesive film, a tape, and a method of making the tape. A thermally curable adhesive film includes a crosslinked (meth)acrylate matrix and a thermally curable, one-part epoxy/thiol resin composition incorporated therein. An adhesive tape includes a liner and a thermally curable adhesive film as described herein.

A film is provided that includes: a crosslinked (meth)acrylate matrix; and a thermally curable, one-part epoxy/thiol resin composition incorporated within the crosslinked (meth)acrylate matrix; wherein the thermally curable, one-part epoxy/thiol resin composition includes: an epoxy resin component that includes an epoxy resin having at least two epoxide groups per molecule; a thiol component that includes a polythiol compound having at least two thiol groups; a nitrogen-containing catalyst for the epoxy resin; and an organic acid.

The thermally curable, one-part epoxy/thiol resin composition incorporated within the crosslinked (meth)acrylate matrix of the adhesive film is a "one-part" composition because it includes the polythiol compound, which is a curing agent, the nitrogen-containing compound, which is a catalyst, the epoxy resin, and the organic acid in admixture. That is, in this context "one-part" means that all components, including the thiol curing agent, the nitrogen-containing catalyst, and any optional additives are admixed with the epoxy resin.

The thermally curable, one-part epoxy/thiol resin compositions incorporated within the crosslinked (meth)acrylate matrices of the adhesive films of the present disclosure demonstrate good storage stability at room temperature, particularly with respect to viscosity maintenance over time, as well as with extended working lives at room temperature, and relatively short curing times at elevated temperatures. In certain embodiments, the thermally curable, one-part epoxy/thiol resin compositions incorporated within the crosslinked (meth)acrylate matrices of the adhesive films of the present disclosure are stable at room temperature for a period of at least 2 weeks, at least 4 weeks, or at least 2 months. In this context, "stable" means that the epoxy/thiol composition remains in a curable form.

It is believed an organic acid prevents the nitrogen-containing catalyst and thiol curing agent from curing the epoxy resin for a period of time (e.g., at least 2 weeks) because the organic acid neutralizes any prematurely dissolved nitrogen-containing catalyst.

The thermally curable, one-part epoxy/thiol resin compositions incorporated within the crosslinked (meth)acrylate matrices of the adhesive films of the present disclosure also possess good low temperature curability. In certain embodiments, the thermally curable, one-part epoxy/thiol resin compositions incorporated within the crosslinked (meth)acrylate matrices of the adhesive films of the present disclosure are curable at a temperature of at least 50° C. In certain embodiments, the thermally curable, one-part epoxy/thiol resin compositions incorporated within the crosslinked (meth)acrylate matrices of the adhesive films of the present disclosure are curable at a temperature of up to 80° C. In certain embodiments, the thermally curable, one-part epoxy/thiol compositions are curable at a temperature of 60° C. to 65° C.

Thus, thermally curable adhesive films, and adhesive tapes that include such films, are suitable for use in temperature-sensitive bonding applications, particularly in the electronics industry, e.g., in cell phone assembly and bonding of plastic and metal parts. They may also be used in a variety of other applications, such as in the automotive and aerospace industries for parts bonding.

Other components that may be included within the curable composition may include fillers, thixotropic agents, diluents, adhesion promoters, and the like. Desirably, the organic acid should be added to the curable composition prior to the addition of the nitrogen-containing catalyst.

Crosslinked (Meth)acrylate Matrix

The crosslinked (meth)acrylate matrix is a reaction product of (meth)acrylate monomers and/or oligomers in the presence of a photoinitiator. The crosslinked matrix is formed in a photocuring method in situ (i.e., in a method of making a thermally curable adhesive film).

That is, the crosslinked matrix is formed in a method that involves: forming a coatable composition by combining components including: a (meth)acrylate resin component that includes (meth)acrylate monomers and/or oligomers, and a photoinitiator; an epoxy resin component that includes an epoxy resin having at least two epoxide groups per molecule; a thiol component that includes a polythiol compound having at least two thiol groups; a nitrogen-containing catalyst for the epoxy resin; and an organic acid. The (meth)acrylate portion of the coatable composition is photocurable, and the epoxy/thiol portion is thermally curable. Upon coating the coatable composition on a liner to form a photocurable coating, and photocuring the photocurable coating, a crosslinked (meth)acrylate matrix is formed, which forms a reservoir for the thermally curable, one-part epoxy/thiol resin composition. This results in a tape that includes a thermally curable adhesive film disposed on a liner In certain embodiments, the (meth)acrylate monomers and/or oligomers have a Tg of 25° C. or below and a tensile strength of at least 1000 psi (6.89 MPa) when homopolymerized.

In certain embodiments, the (meth)acrylate oligomers and/or monomers include urethane (meth)acrylates, alkoxylated bisphenol A di(meth)acrylates, phenoxyethyl (meth)acrylates, (tetrahydro-2-furanyl)methyl 2-propenoate) (meth)acrylates, or combinations thereof.

In certain embodiments, at least a portion of the (meth)acrylate oligomers and/or monomers are multifunctional. In certain embodiments, at least 50 percent by weight (wt-%) of the (meth)acrylate oligomers and/or monomers are multifunctional.

In certain embodiments, the photoinitiator is selected from the group of: benzoin and its derivatives such as alpha-methylbenzoin, alpha-phenylbenzoin, alpha-allylbenzoin, alpha-benzylbenzoin, benzoin ethers such as benzil dimethyl ketal (e.g., OMNIRAD 651 from IGM Resins, St. Charles, IL), benzoin methyl ether, benzoin ethyl ether, and benzoin n-butyl ether; acetophenone and its derivatives such as 2-hydroxy-2-methyl-1-phenyl-1-propanone (e.g., OMNIRAD 1173 from IGM Resins), 1-hydroxycyclohexyl phenyl ketone (e.g., OMNIRAD 184 from IGM Resins), 2-methyl-1-[4-(methylthio)phenyl]-2-(4-morpholinyl)-1-propanone (e.g., OMNIRAD 907 from IGM Resins), 2-benzyl-2-(dimethylamino)-1-[4-(4-morpholinyl)phenyl]-1-butanone (e.g., OMNIRAD 369 from IGM Resins), and bis(2,4,6-trimethylbenzoyl)-phenylphosphineoxide (OMNIRAD 819 from IGM Resins); and phosphinates such as ethyl-2,4,6-trimethylbenzoylphenylphoshinate (e.g. OMNIRAD TPO-L from IGM Resins). Various combinations of photoinitiators may be used if desired.

In certain embodiments, the crosslinked (meth)acrylate component is present in an amount of at least 15 wt-%, at least 20 wt-%, at least 25 wt-%, at least 30 wt-%, at least 35 wt-%, or at least 40 wt-%, based on the total weight of the adhesive film. In certain embodiments, the crosslinked (meth)acrylate component is present in an amount of up to 50 wt-%, up to 40 wt-%, or up to 30 wt-%, based on the total weight of the adhesive film.

Epoxy Resin Component

The epoxy resin component (included in the thermally curable, one-part epoxy/polythiol resin composition incorporated within the crosslinked (meth)acrylate matrix of the adhesive film of the present disclosure) contains an epoxy resin that has at least two epoxy functional groups (i.e., oxirane groups) per molecule. As used herein, the term oxirane group refers to the following divalent group.

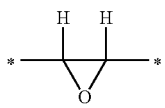

The asterisks denote a site of attachment of the oxirane group to another group. If an oxirane group is at the terminal position of the epoxy resin, the oxirane group is typically bonded to a hydrogen atom.

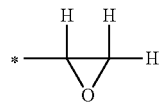

This terminal oxirane group is often part of a glycidyl group.

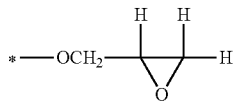

The epoxy resin includes a resin with at least two oxirane groups per molecule. For example, an epoxy compound can have 2 to 10, 2 to 6, or 2 to 4 oxirane groups per molecule. The oxirane groups are usually part of a glycidyl group.

Epoxy resins can include a single material or mixture of materials (e.g., monomeric, oligomeric, or polymeric compounds) selected to provide the desired viscosity characteristics before curing and to provide the desired mechanical properties after curing. If the epoxy resin includes a mixture of materials, at least one of the epoxy resins in the mixture is usually selected to have at least two oxirane groups per molecule. For example, a first epoxy resin in the mixture can have two to four or more oxirane groups and a second epoxy resin in the mixture can have one to four oxirane groups. In some of these examples, the first epoxy resin is a first glycidyl ether with two to four glycidyl groups and the second epoxy resin is a second glycidyl ether with one to four glycidyl groups.

The portion of the epoxy resin that is not an oxirane group (i.e., an epoxy resin compound minus the oxirane groups) can be aromatic, aliphatic, or a combination thereof and can be linear, branched, cyclic, or a combination thereof. The aromatic and aliphatic portions of the epoxy resin can include heteroatoms or other groups that are not reactive with the oxirane groups. That is, the epoxy resin can include halo groups, oxy groups such as in an ether linkage group, thio groups such as in a thio ether linkage group, carbonyl groups, carbonyloxy groups, carbonylimino groups, phosphono groups, sulfono groups, nitro groups, nitrile groups, and the like. The epoxy resin can also be a silicone-based material such as a polydiorganosiloxane-based material.

Although the epoxy resin can have any suitable molecular weight, the weight average molecular weight is usually at least 100 grams/mole, at least 150 grams/mole, at least 175 grams/mole, at least 200 grams/mole, at least 250 grams/mole, or at least 300 grams/mole. The weight average molecular weight can be up to 50,000 grams/mole or even higher for polymeric epoxy resins. The weight average molecular weight is often up to 40,000 grams/mole, up to 20,000 grams/mole, up to 10,000 grams/mole, up to 5,000 grams/mole, up to 3,000 grams/mole, or up to 1,000 grams/mole. For example, the weight average molecular weight can be in the range of 100 to 50,000 grams/mole, in the range of 100 to 20,000 grams/mole, in the range of 10 to 10,000 grams/mole, in the range of 100 to 5,000 grams/mole, in the range of 200 to 5,000 grams/mole, in the range of 100 to 2,000 grams/mole, in the range of 200 to 2,000 grams/mole, in the range of 100 to 1,000 grams/mole, or in the range of 200 to 1,000 grams/mole.

Suitable epoxy resins are typically a liquid at room temperature; however, solid epoxy resins that can be dissolved in one of the other components of the composition, such as a liquid epoxy resin, can be used if desired. In most embodiments, the epoxy resin is a glycidyl ether. Exemplary glycidyl ethers can be of Formula (I).

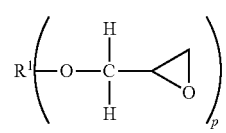

In Formula (I), group $R^1$ is a polyvalent group that is aromatic, aliphatic, or a combination thereof. Group $R^1$ can be linear, branched, cyclic, or a combination thereof. Group $R^1$ can optionally include halo groups, oxy groups, thio groups, carbonyl groups, carbonyloxy groups, carbonylimino groups, phosphono groups, sulfono groups, nitro groups, nitrile groups, and the like. Although the variable p can be any suitable integer greater than or equal to 2, p is often an integer in the range of 2 to 10, in the range of 2 to 6, or in the range of 2 to 4.

In some embodiments, the epoxy resin is a polyglycidyl ether of a polyhydric phenol, such as polyglycidyl ethers of bisphenol A, bisphenol F, bisphenol AD, catechol, and resorcinol. In some embodiments, the epoxy resin is a reaction product of a polyhydric alcohol with epichlorohydrin. Exemplary polyhydric alcohols include butanediol, polyethylene glycol, and glycerin. In some embodiments, the epoxy resin is an epoxidised (poly)olefinic resin, epoxidised phenolic novolac resin, epoxidised cresol novolac resin, and cycloaliphatic epoxy resin. In some embodiments, the epoxy resin is a glycidyl ether ester, such as that which can be obtained by reacting a hydroxycarboxylic acid with epichlorohydrin, or a polyglycidyl ester, such as that which can be obtained by reacting a polycarboxylic acid with epichlorohydrin. In some embodiments, the epoxy resin is a urethane-modified epoxy resin. Various combinations of two or more epoxy resins can be used if desired.

In some exemplary epoxy resins of Formula (I), the variable p is equal to 2 (i.e., the epoxy resin is a diglycidyl ether) and $R^1$ includes an alkylene (i.e., an alkylene is a divalent radical of an alkane and can be referred to as an alkane-diyl), heteroalkylene (i.e., a heteroalkylene is a divalent radical of a heteroalkane and can be referred to as a heteroalkane-diyl), arylene (i.e., a divalent radical of an arene compound), or combination thereof. Suitable alkylene groups often have 1 to 20 carbon atoms, 1 to 12 carbon atoms, 1 to 8 carbon atoms, or 1 to 4 carbon atoms. Suitable heteroalkylene groups often have 2 to 50 carbon atoms, 2 to 40 carbon atoms, 2 to 30 carbon atoms, 2 to 20 carbon atoms, 2 to 10 carbon atoms, or 2 to 6 carbon atoms with 1 to 10 heteroatoms, 1 to 6 heteroatoms, or 1 to 4 heteroatoms. The heteroatoms in the heteroalkylene can be selected from oxy, thio, or —NH— groups but are often oxy groups. Suitable arylene groups often have 6 to 18 carbon atoms or 6 to 12 carbon atoms. For example, the arylene can be phenylene, fluorenylene, or biphenylene. Group $R^1$ can further optionally include halo groups, oxy groups, thio groups, carbonyl groups, carbonyloxy groups, carbonylimino groups, phosphono groups, sulfono groups, nitro groups, nitrile groups, and the like. The variable p is usually an integer in the range of 2 to 4.

Some epoxy resins of Formula (I) are diglycidyl ethers where $R^1$ includes (a) an arylene group or (b) an arylene group in combination with an alkylene, heteroalkylene, or both. Group $R^1$ can further include optional groups such as halo groups, oxy groups, thio groups, carbonyl groups, carbonyloxy groups, carbonylimino groups, phosphono groups, sulfono groups, nitro groups, nitrile groups, and the like. These epoxy resins can be prepared, for example, by reacting an aromatic compound having at least two hydroxyl groups with an excess of epichlorohydrin. Examples of useful aromatic compounds having at least two hydroxyl groups include, but are not limited to, resorcinol, catechol, hydroquinone, p,p'-dihydroxydibenzyl, p,p'-dihydroxyphenylsulfone, p,p'-dihydroxybenzophenone, 2,2'-dihydroxyphenyl sulfone, p,p'-dihydroxybenzophenone, and 9,9-(4-hydroxyphenol)fluorene. Still other examples include the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylenphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

Some commercially available diglycidyl ether epoxy resins of Formula (I) are derived from bisphenol A (i.e., bisphenol A is 4,4'-dihydroxydiphenylmethane). Examples include, but are not limited to, those available under the trade designation EPON (e.g., EPON 1510, EPON 1310, EPON 828, EPON 872, EPON 1001, EPON 1004, and EPON 2004) from Hexion Specialty Chemicals, Inc. (Columbus, OH), those available under the trade designation DER (e.g., DER 331, DER 332, DER 336, and DER 439) from Olin Epoxy Co. (St. Louis, MO), and those available under the trade designation EPICLON (e.g., EPICLON 850) from Dainippon Ink and Chemicals, Inc. (Parsippany, NJ). Other commercially available diglycidyl ether epoxy resins are derived from bisphenol F (i.e., bisphenol F is 2,2'-dihydroxydiphenylmethane). Examples include, but are not limited to, those available under the trade designation DER (e.g., DER 334) from Olin Epoxy Co. (St. Louis, MO), those available under the trade designation EPICLON (e.g., EPICLON 830) from Dainippon Ink and Chemicals, Inc. (Parsippany, NJ), and those available under the trade designation ARALDITE (e.g., ARALDITE 281) from Huntsman Corporation (The Woodlands, TX).

Other epoxy resins of Formula (I) are diglycidyl ethers of a poly(alkylene oxide) diol. These epoxy resins also can be referred to as diglycidyl ethers of a poly(alkylene glycol) diol. The variable p is equal to 2 and $R^1$ is a heteroalkylene having oxygen heteroatoms. The poly(alkylene glycol) portion can be a copolymer or homopolymer and often includes alkylene units having 1 to 4 carbon atoms. Examples include, but are not limited to, diglycidyl ethers of poly(ethylene oxide) diol, diglycidyl ethers of poly(propylene oxide) diol, and diglycidyl ethers of poly(tetramethylene oxide) diol. Epoxy resins of this type are commercially available from Polysciences, Inc. (Warrington, PA) such as those derived from a poly(ethylene oxide) diol or from a poly(propylene oxide) diol having a weight average molecular weight of 400 grams/mole, about 600 grams/mole, or about 1000 grams/mole.

Still other epoxy resins of Formula (I) are diglycidyl ethers of an alkane diol (R' is an alkylene and the variable p is equal to 2). Examples include a diglycidyl ether of 1,4-dimethanol cyclohexyl, diglycidyl ether of 1,4-butanediol, and a diglycidyl ether of the cycloaliphatic diol formed from a hydrogenated bisphenol A such as those commercially available under the trade designation EPONEX (e.g., EPONEX 1510) from Hexion Specialty Chemicals, Inc. (Columbus, OH) and under the trade designation EPALLOY (e.g., EPALLOY 5001) from CVC Thermoset Specialties (Moorestown, NJ).

For some applications, the epoxy resins chosen for use in the curable coating compositions are novolac epoxy resins, which are glycidyl ethers of phenolic novolac resins. These resins can be prepared, for example, by reaction of phenols with an excess of formaldehyde in the presence of an acidic catalyst to produce the phenolic novolac resin. Novolac epoxy resins are then prepared by reacting the phenolic novolac resin with epichlorihydrin in the presence of sodium hydroxide. The resulting novolac epoxy resins typically have more than two oxirane groups and can be used to produce cured coating compositions with a high crosslinking density. The use of novolac epoxy resins can be particularly desirable in applications where corrosion resistance, water resistance, chemical resistance, or a combination thereof is desired. One such novolac epoxy resin is poly[(phenyl glycidyl ether)-co-formaldehyde]. Other suitable novolac resins are commercially available under the trade designation ARALDITE (e.g., ARALDITE GY289, ARALDITE EPN 1183, ARALDITE EP 1179, ARALDITE EPN 1139, and ARALDITE EPN 1138) from Huntsman Corporation (The Woodlands, TX), under the trade designation EPALLOY (e.g., EPALLOY 8230) from CVC Thermoset Specialties (Moorestown, NJ), and under the trade designation DEN (e.g., DEN 424 and DEN 431) from Olin Epoxy Co. (St. Louis, MO).

Yet other epoxy resins include silicone resins with at least two glycidyl groups and flame retardant epoxy resins with at least two glycidyl groups (e.g., a brominated bisphenol-type epoxy resin having at least two glycidyl groups such as that commercially available from Dow Chemical Co. (Midland, MI) under the trade designation DER 580).

The epoxy resin component is often a mixture of materials. For example, the epoxy resins can be selected to be a mixture that provides the desired viscosity or flow characteristics prior to curing. For example, within the epoxy resin may be reactive diluents that include monofunctional or certain multifunctional epoxy resins. The reactive diluent should have a viscosity which is lower than that of the epoxy resin having at least two epoxy groups. Ordinarily, the reactive diluent should have a viscosity less than 250 mPa·s (cPs). The reactive diluent tends to lower the viscosity of the epoxy/polythiol resin composition and often has either a branched backbone that is saturated or a cyclic backbone that is saturated or unsaturated. Preferred reactive diluents have only one functional group (i.e., oxirane group) such as various monoglycidyl ethers. Some exemplary monofunctional epoxy resins include, but are not limited to, those with an alkyl group having 6 to 28 carbon atoms, such as (C6-C28)alkyl glycidyl ethers, (C6-C28)fatty acid glycidyl esters, (C6-C28)alkylphenol glycidyl ethers, and combinations thereof. In the event a monofunctional epoxy resin is the reactive diluent, such monofunctional epoxy resin should be employed in an amount of up to 50 parts based on the total of the epoxy resin component.

In some embodiments, the epoxy resin component (included in the thermally curable, one-part epoxy/polythiol resin composition incorporated within the crosslinked (meth)acrylate matrix of the adhesive film of the present disclosure) is present in an amount of at least 15 wt-%, at least 20 wt-%, at least 25 wt-%, at least 30 wt-%, at least 35 wt-%, or at least 40 wt-%, based on the total weight of the adhesive film. If lower levels are used, the cured composition may not contain enough polymeric material (e.g., epoxy resin) to provide desired coating characteristics and adhesive strength. In some embodiments, the epoxy resin component (included in the thermally curable, one-part epoxy/polythiol resin composition incorporated within the crosslinked (meth)acrylate matrix of the adhesive film of the present disclosure) is present in an amount of up to 60 wt-%, up to 50 wt-%, or up to 40 wt-%, based on the total weight of the adhesive film.

Thiol Component

The thiol component (included in the thermally curable, one-part epoxy/polythiol resin composition incorporated within the crosslinked (meth)acrylate matrix of the adhesive film of the present disclosure) contains a thiol compound (i.e., is an organosulfur compound) that contains a carbon-bonded sulfhydryl or mercapto (—C—SH) group. Suitable polythiols are selected from a wide variety of compounds that have two or more thiol groups per molecule, and that function as curatives for epoxy resins.

In certain embodiments, suitable polythiol compounds have at least two primary and/or secondary thiol groups. In certain embodiments, suitable polythiol compounds have at least two primary thiol groups.

Examples of suitable polythiol compounds having at least two primary and/or secondary thiol groups include trimethylolpropane tris(beta-mercaptopropionate), trimethylolpropane tris(thioglycolate), pentaerythritol tetrakis(thioglycolate), pentaerythritol tetrakis(beta-mercaptopropionate), dipentaerythritol poly(beta-mercaptopropionate), ethylene glycol bis(beta-mercaptopropionate), a (C1-C12)alkyl polythiol (e.g., butane-1,4-dithiol and hexane-1,6-dithiol), a (C6-C12)aromatic polythiol (e.g., p-xylenedithiol and 1,3,5-tris (mercaptomethyl) benzene). Combinations of polythiols can be used if desired.

In some embodiments, the thiol component of the thermally curable, one-part epoxy/thiol resin composition is present in an amount of at least 10 wt-%, at least 20 wt-%, or at least 30 wt-%, based on the total weight of the adhesive film. In some embodiments, the thiol component of the thermally curable, one-part epoxy/thiol resin composition is present in an amount of up to 40 wt-%, up to 35 wt-%, up to 30 wt-%, up to 25 wt-%, up to 20 wt-%, or up to 15 wt-%, based on the total weight of the adhesive film.

In some embodiments, the ratio of the epoxy component to the thiol component in the curable epoxy/thiol resin compositions of the present disclosure is from 0.5:1 to 1.5:1, or 0.75:1 to 1.3:1 (epoxy:thiol equivalents), and preferably at 1:1.

Systems containing epoxy resins and polythiols suitable for use in the present disclosure are disclosed in U.S. Pat. No. 5,430,112 (Sakata et al.).

Nitrogen-Containing Catalyst

The thermally curable, one-part epoxy/thiol resin compositions within the adhesive films of the present disclosure include at least one nitrogen-containing catalyst. Such catalysts are typically of the heat activated class. In certain embodiments, the nitrogen-containing catalyst is capable of activation at temperatures at or above 50° C. to effect the thermal curing of the epoxy resin.

Suitable nitrogen-containing catalysts are typically a solid at room temperature, and not soluble in the other components of the epoxy/thiol resin compositions of the present disclosure. In certain embodiments, the nitrogen-containing catalysts are in particle form having a particle size (i.e., the largest dimension of the particles, such as the diameter of a sphere) of up to 100 micrometers (i.e., microns). It is preferred that the particle size is less than (<) 10 microns.

As used herein, the term "nitrogen-containing catalyst" refers to any nitrogen-containing compound that catalyzes the curing of the epoxy resin. The term does not imply or suggest a certain mechanism or reaction for curing. The nitrogen-containing catalyst can directly react with the oxirane ring of the epoxy resin, can catalyze or accelerate the reaction of the polythiol compound with the epoxy resin, or can catalyze or accelerate the self-polymerization of the epoxy resin.

In certain embodiments, the nitrogen-containing catalysts are amine-containing catalysts. Some amine-containing catalysts have at least two groups of formula —$NR^2H$, wherein $R^2$ is selected from hydrogen, alkyl, aryl, alkaryl, or aralkyl. Suitable alkyl groups often have 1 to 12 carbon atoms, 1 to 8 carbon atoms, 1 to 6 carbon atoms, or 1 to 4 carbon atoms. The alkyl group can be cyclic, branched, linear, or a combination thereof. Suitable aryl groups usually have 6 to 12 carbon atom such as a phenyl or biphenyl group. Suitable alkylaryl groups can include the same aryl and alkyl groups discussed above.

The nitrogen-containing catalyst minus the at least two amino groups (i.e., the portion of the catalyst that is not an amino group) can be any suitable aromatic group, aliphatic group, or combination thereof.

Exemplary nitrogen-containing catalysts for use herein include a reaction product of phthalic anhydride and an aliphatic polyamine, more particularly a reaction product of approximately equimolar proportions of phthalic acid and diethylamine triamine, as described in British Patent 1,121,196 (Ciba Geigy AG). A catalyst of this type is available commercially from Ciba Geigy AG under the tradename CIBA HT 9506.

Yet another type of nitrogen-containing catalyst is a reaction product of: (i) a polyfunctional epoxy compound; (ii) an imidazole compound, such as 2-ethyl-4-methylimidazole; and (iii) phthalic anhydride. The polyfunctional epoxy compound may be a compound having two or more epoxy groups in the molecule as described in U.S. Pat. No. 4,546,155 (Hirose et al.). A catalyst of this type is commercially available from Ajinomoto Co. Inc. (Tokyo, Japan) under the tradename AJICURE PN-23, which is believed to be an adduct of EPON 828 (bisphenol type epoxy resin epoxy equivalent 184-194, commercially available from Hexion Specialty Chemicals, Inc. (Columbus, OH)), 2-ethyl-4-methylimidazole, and phthalic anhydride.

Other suitable nitrogen-containing catalysts include the reaction product of a compound having one or more isocyanate groups in its molecule with a compound having at least one primary or secondary amino group in its molecule. Additional nitrogen-containing catalysts include 2-heptadeoylimidazole, 2-phenyl-4,5-dihydroxymethylimidazole, 2-phenyl-4-methyl-5-hydroxymethylimidazole, 2-phenyl-4-benzyl-5-hydroxymethylimidazole, 2,4-diamino-8-2-methylimidazolyl-(1)-ethyl-5-triazine, or a combination thereof, as well as products of triazine with isocyanuric acid, succinohydrazide, adipohydrazide, isophtholohydrazide, o-oxybenzohydrazide, salicylohydrazide, or a combination thereof.

Nitrogen-containing catalysts are commercially available from sources such as Ajinomoto Co. Inc. (Tokyo, Japan) under the tradenames AMICURE MY-24, AMICURE GG-216 and AMICURE ATU CARBAMATE, from Hexion Specialty Chemicals, Inc. (Columbus, OH) under the tradename EPIKURE P-101, from T&K Toka (Chikumazawa, Miyoshi-Machi, Iruma-Gun, Saitama, Japan) under the tradenames FXR-1020, FXR-1081, and FXR-1121, from Shikoku (Marugame, Kagawa Prefecture, Japan) under the tradenames CUREDUCT P-2070 and P-2080, from Air Products and Chemicals (Allentown, PA) under the tradenames ANCAMINE 2441 and 2442, from AC Catalysts (Linden, NJ) under the tradenames TECHNICURE LC80 and LC100, and from Asahi Kasei Kogyo, K.K. (Japan) under the tradename NOVACURE HX-372.

Other suitable nitrogen-containing catalysts are those described in U.S. Pat. No. 5,077,376 (Dooley et al.) and U.S. Pat. No. 5,430,112 (Sakata et al.) referred to as "amine adduct latent accelerators." Other exemplary nitrogen-containing catalysts are described, for example, in British Patent 1,121,196 (Ciba Geigy AG), European Patent Application No. 138465A (Ajinomoto Co.), and European Patent Application No. 193068A (Asahi Chemical).

In some embodiments, the curable epoxy/thiol resin compositions typically include at least 1 part, at least 2 parts, at least 3 parts, at least 4 parts, or at least 5 parts, of a nitrogen-containing catalyst, per 100 parts of the epoxy resin component. In some embodiments, the curable epoxy/thiol compositions typically include up to 45 parts, up to 40 parts, up to 35 parts, up to 30 parts, up to 25 parts, or up to 20 parts, of a nitrogen-containing catalyst, per 100 parts of the epoxy resin component. Various combinations of two or more nitrogen-containing catalysts can be used if desired.

Organic Acids

The organic acids (included in the thermally curable, one-part epoxy/polythiol resin composition incorporated within the crosslinked (meth)acrylate matrix of the adhesive film of the present disclosure) include those that are soluble or insoluble in the epoxy/thiol resin compositions of the present disclosure.

In certain embodiments, the organic acid is in the form of solid insoluble particles. In certain embodiments, the organic acid particles have a mean particle size in a range of 0.1 micron to 500 microns, or 5 microns to 100 microns, or 10 microns to 50 microns.

In certain embodiments, the organic acid is soluble in the epoxy/thiol resin composition. In this context, an organic acid is "soluble in the epoxy/thiol resin composition," when incorporated in an epoxy/thiol resin composition in an amount of 5 wt-%, produces an epoxy/thiol resin composition with at least 80% clarity and/or at least 80% transmission, as evaluated according to the Solubility Test in the Examples Section. In certain embodiments, the clarity of a curable epoxy/thiol resin composition that includes 5 wt-% of a "soluble" organic acid is at least 85%, at least 90%, or at least 95%. In certain embodiments, the transmission of a curable epoxy/thiol resin composition that includes 5 wt-% of a "soluble" organic acid is at least 85%, or at least 90%.

An organic acid is used in the thermally curable, one-part epoxy/thiol resin composition in an amount that allows the epoxy/thiol resin composition to remain curable for at least 1 week at room temperature such that there is less than 5% change in the total exotherm of the epoxy/thiol crosslinking reaction. Typically, this is an amount of at least 0.02 wt-%, or at least 0.03 wt-%, based on the total weight of the adhesive film.

The greater the amount of an organic acid used in an epoxy/thiol resin composition, generally the longer the shelf life of the curable epoxy/thiol composition. The greater the amount of an organic acid used in an epoxy/thiol resin composition, generally the longer the time required to cure and/or the higher the temperature required to cure the thermally curable epoxy/thiol composition. Thus, depending on the use of the curable composition, there is a balance between shelf life and cure time/temperature. Typically, for a reasonable shelf life, cure time, and cure temperature, the amount of organic acid used is up to 1.0 wt-%, or up to 0.5 wt-%, based on the total weight of the adhesive film.

Suitable organic acids act as stabilizers of the nitrogen-containing catalyst in the epoxy/thiol resin compositions of the present disclosure. Desirably, the nitrogen-containing catalyst is stabilized against curing the epoxy resin at room temperature for a period of at least 2 weeks, at least 4 weeks, or at least 2 months.

In certain embodiments, suitable organic acids have a pKa less than the pKa of the polythiol component. Typical thiols have pKas within the range of about 8-12. Desirable acids are those having a pKa of up to 12, up to 10, or up to 9. Where a combination of two or more organic acids is used, the pKa of the combination should be no greater than 12.

Suitable organic acids are described in U.S. Pat. No. 6,653,371 (Burns et al.) and include substantially insoluble solid organic acids such as carboxylic acids, benzoic acids, quinones, phenols, and enolisable materials. Examples of such organic acids include 4-nitroguaiacol, 3,4,5-trimethoxy benzoic acid, hexachlorophene, 4,5,7-trihydroxyflavanone, phloroglucinol, fumaric acid, 3,4-dihydroxy benzoic acid, 3,4,5-trihydroxy benzoic acid, 6-hydroxy-2,5,7,8-tetramethylchroman-2 carboxylic acid, pamoic acid, ascorbic acid, citric acid, 3,4-dihydroxy cinnamic acid, 2,3-dicyanohydroquinone, barbituric acid, tetrahydroxy-p-benzoquinone, parabanic acid, phenyl boronic acid, 5-phenyl Meldrum's acid, Meldrum's acid, and combinations thereof.

In certain embodiments, the organic acid is a barbituric acid derivative. Herein, the barbituric acid "derivatives" include those barbituric acid compounds substituted at one or more of the 1, 3, and/or 5 N positions, or at the 1 and/or 3 N positions and optionally at the 5 N position, with an aliphatic, cycloaliphatic, or aromatic group. Such barbituric acid derivatives may or may not be soluble in a curable epoxy/thiol resin composition.

In certain embodiments, the barbituric acid derivatives include those of Formula (II).

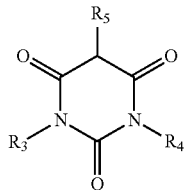

wherein one or more of the $R^3$, $R^4$, and $R^5$ groups are represented by hydrogen, an aliphatic group, a cycloaliphatic group, or an aromatic group (e.g., phenyl), optionally further substituted in any position with one or more of (C1-C4)alkyl, —OH, halide (F, Br, Cl, I), phenyl, (C1-C4) alkylphenyl, (C1-C4)alkenylphenyl, nitro, or —$OR^6$ where $R^6$ is phenyl, a carboxylic group, a carbonyl group, or an aromatic group and $R^6$ is optionally substituted with (C1-C4)alkyl, —OH, or halide; and further wherein at least one of the $R^3$, $R^4$, and $R^5$ groups is not hydrogen. In certain embodiments, at least two of the $R^3$, $R^4$, and $R^5$ groups are not hydrogen.

Examples of suitable substituted barbituric acid derivatives include 1-benzyl-5-phenylbarbituric acid, 1-cyclohexyl-5-ethylbarbituric acid (available from Chemische Fabrik Berg, Bitterfeld-Wolfen, Germany), 1,3-dimethylbarbituric acid (available from Alfa Aesar, Tewksbury, MA), and combinations thereof.

Optional Additives in the Curable, One-Part Epoxy/Thiol Composition

In addition to the epoxy resin component, the thiol component, and the nitrogen-containing catalyst, the thermally curable, one-part epoxy/thiol composition incorporated within the crosslinked (meth)acrylate matrix can include various optional additives. One such optional additive is a toughening agent. Toughening agents can be added to provide the desired overlap shear, peel resistance, and impact strength. Useful toughening agents are polymeric materials that may react with the epoxy resin and that may be crosslinked. Suitable toughening agents include polymeric compounds having both a rubbery phase and a thermoplastic phase or compounds which are capable of forming, with the epoxide resin, both a rubbery phase and a thermoplastic phase on curing. Polymers useful as toughening agents are preferably selected to inhibit cracking of the cured epoxy composition.

Some polymeric toughening agents that have both a rubbery phase and a thermoplastic phase are acrylic core-shell polymers wherein the core is an acrylic copolymer having a glass transition temperature below 0° C. Such core polymers may include polybutyl acrylate, polyisooctyl acrylate, polybutadiene-polystyrene in a shell comprised of an acrylic polymer having a glass transition temperature above 25° C., such as polymethylmethacrylate. Commercially available core-shell polymers include those available as a dry powder under the trade designations ACRYLOID KM 323, ACRYLOID KM 330, and PARALOID BTA 731, from Dow Chemical Co., and KANE ACE B-564 from Kaneka Corporation (Osaka, Japan). These core-shell polymers may also be available as a predispersed blend with a diglycidyl ether of bisphenol A at, for example, a ratio of 12 to 37 parts by weight of the core-shell polymer and are available under the trade designations KANE ACE (e.g., KANE ACE MX 157, KANE ACE MX 257, and KANE ACE MX 125) from Kaneka Corporation (Japan).

Another class of polymeric toughening agents that are capable of forming, with the epoxide group-containing material, a rubbery phase on curing, are carboxyl-terminated butadiene acrylonitrile compounds. Commercially available carboxyl-terminated butadiene acrylonitrile compounds include those available under the trade designations HYCAR (e.g., HYCAR 1300X8, HYCAR 1300X13, and HYCAR 1300X17) from Lubrizol Advanced Materials, Inc. (Cleveland, Ohio) and under the trade designation PARALOID (e.g., PARALOID EXL-2650) from Dow Chemical (Midland, MI).

Other polymeric toughening agents are graft polymers, which have both a rubbery phase and a thermoplastic phase, such as those disclosed in U.S. Pat. No. 3,496,250 (Czerwinski). These graft polymers have a rubbery backbone having grafted thereto thermoplastic polymer segments. Examples of such graft polymers include, for example, (meth)acrylate-butadiene-styrene, and acrylonitrile/butadiene-styrene polymers. The rubbery backbone is preferably prepared so as to constitute from 95 wt-% to 40 wt-% of the total graft polymer, so that the polymerized thermoplastic portion constitutes from 5 wt-% to 60 wt-% of the graft polymer.

Still other polymeric toughening agents are polyether sulfones such as those commercially available from BASF (Florham Park, NJ) under the trade designation ULTRASON (e.g., ULTRASON E 2020 P SR MICRO).

The curable, one-part epoxy/thiol composition within the crosslinked (meth)acrylate matrix can additionally contain a non-reactive plasticizer to modify rheological properties. Commercially available plasticizers include those available under the trade designation BENZOFLEX 131 from Eastman Chemical (Kingsport, TN), JAYFLEX DINA available from ExxonMobil Chemical (Houston, TX), and PLASTOMOLL (e.g., diisononyl adipate) from BASF (Florham Park, NJ).

The thermally curable, one-part epoxy/thiol composition incorporated within the crosslinked (meth)acrylate matrix optionally contains a flow control agent or thickener, to provide the desired rheological characteristics to the composition. Suitable flow control agents include fumed silica, such as treated fumed silica, available under the trade designation CAB-O-SIL TS 720, and untreated fumed silica available under the trade designation CAB-O-SIL M5, from Cabot Corp. (Alpharetta, GA).

In some embodiments, the thermally curable, one-part epoxy/thiol composition incorporated within the crosslinked (meth)acrylate matrix optimally contains adhesion promoters to enhance the bond to a substrate. The specific type of adhesion promoter may vary depending upon the composition of the surface to which it will be adhered. Adhesion promoters that have been found to be particularly useful for surfaces coated with ionic type lubricants used to facilitate the drawing of metal stock during processing include, for example, dihydric phenolic compounds such as catechol and thiodiphenol.

The thermally curable, one-part epoxy/thiol composition incorporated within the crosslinked (meth)acrylate matrix optionally may also contain one or more conventional additives such as fillers (e.g., aluminum powder, carbon black, glass bubbles, talc, clay, calcium carbonate, barium sulfate, titanium dioxide, silica such as fused silica, silicates, glass beads, and mica), pigments, flexibilizers, reactive diluents, non-reactive diluents, fire retardants, antistatic materials, thermally and/or electrically conductive particles, and expanding agents including, for example, chemical blowing agents such as azodicarbonamide or expandable polymeric microspheres containing a hydrocarbon liquid, such as those sold under the trade designation EXPANCEL by Expancel Inc. (Duluth, GA). Particulate fillers can be in the form of flakes, rods, spheres, and the like. Additives are typically added in amounts to produce the desired effect in the resulting adhesive.

The amount and type of such additives may be selected by one skilled in the art, depending on the intended end use of the composition.

Adhesive Tape and Method of Making

The present disclosure also provides an adhesive tape that includes a thermally curable film disposed on a release liner. A representative example is shown in FIG. 1, wherein the adhesive tape 10 includes a thermally curable film 20 disposed on a release liner 30 (not to scale). The thermally curable film 20 includes the thermally curable, one-part epoxy/thiol composition 21 incorporated within the crosslinked (meth)acrylate matrix 22. In certain embodiments, an adhesive tape can include a second liner (not shown), wherein the thermally curable adhesive film is disposed (i.e., sandwiched) between the two liners.

Release liners are well-known in the art, and any known release liner may be used. Typically, the release liner comprises a film or paper substrate coated with a release material. Conventional liners have differential release properties which allow the tape to be unrolled after winding without liner confusion. Examples of suitable commercially available release liners include, but are not limited to, silicone coated papers, and silicone coated films, such as polyester films (e.g., polyethylene terephthalate films), and polyolefin films (e.g., polyethylene films). Suitable release liners are also disclosed in U.S. Pat. No. 6,835,422 (Kobe et al.), U.S. Pat. No. 6,805,933 (Patel et al.), U.S. Pat. No. 6,780,484 (Kobe et al.), and U.S. Pat. No. 6,204,350 (Liu et al.).

In certain embodiments, one of the two liners has a peel strength of no greater than 10 grams/25 millimeters (mm), and one of the two liners has a peel strength of at least 30 grams/25 mm. In certain embodiments, one of the two liners has a peel strength of 1 gram/25 mm to 10 grams/25 mm, and one of the two liners has a peel strength of 30 grams/25 mm to 50 grams/25 mm.

The present disclosure also provides a method of making an adhesive tape that includes a thermally curable adhesive film disposed on a liner, The method includes: forming a coatable composition by combining components including: a (meth)acrylate resin component that includes (meth)acrylate monomers and/or oligomers, and a photoinitiator; an epoxy resin component that includes an epoxy resin having at least two epoxide groups per molecule; a thiol component that includes a polythiol compound having at least two thiol groups; a nitrogen-containing catalyst for the epoxy resin; and an organic acid; coating the coatable composition on a liner to form a photocurable coating; and photocuring the photocurable coating to form a thermally curable adhesive film disposed on the liner, wherein the thermally curable adhesive film comprises a crosslinked (meth)acrylate matrix having a thermally curable, one-part epoxy/thiol resin composition incorporated therein.

In certain embodiments of the method, the photocuring occurs within a period of time of up to 24 hours after forming a coatable composition.

In certain embodiments of the method, photocuring the photocurable coating includes exposing the photocurable coating to 350 nm to 400 nm light with a total dose of 1000 mJ/cm$^2$ to 2400 mJ/cm$^2$ to form the crosslinked (meth)acrylate matrix.

In certain embodiments of the method, the organic acid is added to the epoxy and thiol components prior to adding the nitrogen-containing catalyst.

Exemplary Embodiments

Embodiment 1 is a thermally curable adhesive film comprising: a crosslinked (meth)acrylate matrix; and a thermally curable, one-part epoxy/thiol resin composition incorporated within the crosslinked (meth)acrylate matrix; wherein the thermally curable, one-part epoxy/thiol resin composition comprises: an epoxy resin component comprising an epoxy resin having at least two epoxide groups per molecule; a thiol component comprising a polythiol compound having at least two thiol groups; a nitrogen-containing catalyst for the epoxy resin; and an organic acid.

Embodiment 2 is the adhesive film of embodiment 1 wherein the thermally curable, one-part epoxy/thiol resin composition is curable at a temperature of at least 50° C.

Embodiment 3 is the adhesive film of embodiment 1 or 2 wherein the thermally curable, one-part epoxy/thiol resin composition is curable at a temperature of up to 80° C.

Embodiment 4 is the adhesive film of any of the preceding embodiments wherein the crosslinked (meth)acrylate matrix is a reaction product of (meth)acrylate monomers and/or oligomers in the presence of a photoinitiator.

Embodiment 5 is the adhesive film of any of the preceding embodiments wherein the crosslinked (meth)acrylate matrix is a reaction product of monomers and/or oligomers comprising (meth)acrylate monomers and/or oligomers having a Tg of 25° C. or below and a tensile strength of at least 1000 psi (6.89 MPa) when homopolymerized.

Embodiment 6 is the adhesive film of embodiment 5 wherein at least a portion of the (meth)acrylate monomers and/or oligomers are multifunctional.

Embodiment 7 is the adhesive film of embodiment 5 or 6 wherein the (meth)acrylate monomers and/or oligomers comprise urethane (meth)acrylates, alkoxylated bisphenol A di(meth)acrylates, phenoxyethyl (meth)acrylates, (tetrahydro-2-furanyl)methyl 2-propenoate) (meth)acrylates, or combinations thereof.

Embodiment 8 is the adhesive film of embodiment 6 or 7 wherein at least 50 wt-% of the (meth)acrylate monomers and/or oligomers are multifunctional.

Embodiment 9 is the adhesive film of any of embodiments 4 through 8 wherein the photoinitiator is selected from the group of benzoin and its derivatives, acetophenone and its derivatives, phosphinates, and combinations thereof.

Embodiment 10 is the adhesive film of any of the preceding embodiments wherein the crosslinked (meth)acrylate component is present in an amount of at least 15 wt-%, at least 20 wt-%, at least 25 wt-%, at least 30 wt-%, at least 35 wt-%, or at least 40 wt-%, based on the total weight of the adhesive film.

Embodiment 11 is the adhesive film of any of the preceding embodiments wherein the crosslinked (meth)acrylate component is present in an amount of up to 50 wt-%, up to 40 wt-%, or up to 30 wt-%, based on the total weight of the adhesive film.

Embodiment 12 is the adhesive film of any of the preceding embodiments wherein the epoxy resin comprises a polyglycidyl ether of a polyhydric phenol, a reaction product of a polyhydric alcohol with epichlorohydrin, an epoxidised (poly)olefinic resin, an epoxidised phenolic novolac resin, an epoxidised cresol novolac resin, a cycloaliphatic epoxy resin, a glycidyl ether ester, a polyglycidyl ester, a urethane-modified epoxy resin, or a combination thereof.

Embodiment 13 is the adhesive film of any of the preceding embodiments wherein the epoxy component of the thermally curable, one-part epoxy/thiol resin composition further comprises a reactive diluent.

Embodiment 14 is the adhesive film of embodiment 13 wherein the reactive diluent has a viscosity of less than 250 mPa·s (cPs).

Embodiment 15 is the adhesive film of embodiment 13 or 14 wherein the reactive diluent is a monofunctional epoxy resin.

Embodiment 16 is the adhesive film of embodiment 15 wherein the monofunctional epoxy resin comprises a (C6-C28)alkyl group.

Embodiment 17 is the adhesive film of embodiment 16 wherein the monofunctional epoxy resin comprises (C6-C28)alkyl glycidyl ethers, (C6-C28)fatty acid glycidyl esters, (C6-C28)alkylphenol glycidyl ethers, or a combination thereof.

Embodiment 18 is the adhesive film of any of the preceding embodiments wherein the epoxy resin component (included in the thermally curable, one-part epoxy/polythiol resin composition incorporated within the crosslinked (meth)acrylate matrix of the adhesive film of the present disclosure) is present in an amount of at least 15 wt-%, at least 20 wt-%, at least 25 wt-%, at least 30 wt-%, at least 35 wt-%, or at least 40 wt-%, based on the total weight of the adhesive film.

Embodiment 19 is the adhesive film of any of the preceding embodiments wherein the epoxy resin component (included in the thermally curable, one-part epoxy/polythiol resin composition incorporated within the crosslinked (meth)acrylate matrix of the adhesive film of the present disclosure) is present in an amount of up to 60 wt-%, up to 50 wt-%, or up to 40 wt-%, based on the total weight of the adhesive film.

Embodiment 20 is the adhesive film of any of the preceding embodiments wherein the thiol component of the thermally curable, one-part epoxy/thiol resin composition comprises a polythiol compound having at least two primary and/or secondary thiol groups.

Embodiment 21 is the adhesive film of embodiment 20 wherein the polythiol compound having at least two primary and/or secondary thiol groups comprises trimethylolpropane tris(beta-mercaptopropionate), trimethylolpropane tris(thioglycolate), pentaerythritol tetrakis(thioglycolate), pentaerythritol tetrakis(beta-mercaptopropionate), dipentaerythritol poly(beta-mercaptopropionate), ethylene glycol bis(beta-mercaptopropionate), a (C1-C12)alkyl polythiol, a (C6-C12)aromatic polythiol, or a combination thereof.

Embodiment 22 is the adhesive film of embodiment 20 or 21 wherein the thiol component comprises a polythiol compound having at least two primary thiol groups.

Embodiment 23 is the adhesive film of any of the preceding embodiments wherein the thiol component (included in the thermally curable, one-part epoxy/polythiol resin composition incorporated within the crosslinked (meth)acrylate matrix of the adhesive film of the present disclosure) is present in an amount of at least 10 wt-%, at least 20 wt-%, or at least 30 wt-%, based on the total weight of the adhesive film.

Embodiment 24 is the adhesive film of any of the preceding embodiments wherein the thiol component (included in the thermally curable, one-part epoxy/polythiol resin composition incorporated within the crosslinked (meth) acrylate matrix of the adhesive film of the present disclosure) is present in an amount of up to 40 wt-%, up to 35 wt-%, up to 30 wt-%, up to 25 wt-%, up to 20 wt-%, or up to 15 wt-%, based on the total weight of the adhesive film.

Embodiment 25 is the adhesive film of any of the preceding embodiments wherein the epoxy component and the thiol component are present in the thermally curable, one-part epoxy/thiol resin composition in a ratio of from 0.5:1 to 1.5:1, or 0.75:1 to 1.3:1 (epoxy:thiol equivalents).

Embodiment 26 is the adhesive film of any of the preceding embodiments wherein the nitrogen-containing catalyst of the thermally curable, one-part epoxy/thiol resin composition is solid at room temperature.

Embodiment 27 is the adhesive film of any of the preceding embodiments wherein the nitrogen-containing catalyst of the thermally curable, one-part epoxy/thiol resin composition is capable of activation at temperatures at or above 50° C. to effect the thermal curing of the epoxy resin.

Embodiment 28 is the adhesive film of any of the preceding embodiments wherein the nitrogen-containing catalyst of the thermally curable, one-part epoxy/thiol resin composition is an amine-containing catalyst.

Embodiment 29 is the adhesive film of embodiment 28 wherein the amine-containing catalyst has at least two groups of formula —$NR^2H$, wherein $R^2$ is selected from hydrogen, alkyl, aryl, alkaryl, or aralkyl.

Embodiment 30 is the adhesive film of embodiment 29 wherein the amine-containing catalyst comprises a reaction product of phthalic anhydride and an aliphatic polyamine.

Embodiment 31 is the adhesive film of embodiment 29 wherein the amine-containing catalyst comprises a reaction product of: (i) a polyfunctional epoxy compound; (ii) an imidazole compound, such as 2-ethyl-4-methylimidazole; and (iii) phthalic anhydride.

Embodiment 32 is the adhesive film of embodiment 29 wherein the amine-containing catalyst comprises a reaction product of a compound having one or more isocyanate groups in its molecule with a compound having at least one primary or secondary amino group in its molecule.

Embodiment 33 is the adhesive film of embodiment 29 wherein the amine-containing catalyst comprises 2-heptadeoylimidazole, 2-phenyl-4,5-dihydroxymethylimidazole, 2-phenyl-4-methyl-5-hydroxymethylimidazole, 2-phenyl-4-benzyl-5-hydroxymethylimidazole, 2,4-diamino-8-2-methylimidazolyl-(1)-ethyl-5-triazine, or a combination thereof.

Embodiment 34 is the adhesive film of embodiment 29 wherein the amine-containing catalyst comprises products of triazine with isocyanuric acid, succinohydrazide, adipohydrazide, isophtholohydrazide, o-oxybenzohydrazide, salicylohydrazide, or a combination thereof.

Embodiment 35 is the adhesive film of any of the preceding embodiments wherein the amine-containing catalyst of the thermally curable, one-part epoxy/thiol resin composition is present in the thermally curable, one-part epoxy/thiol composition in an amount of at least 1 part, at least 2 parts, at least 3 parts, at least 4 parts, or at least 5 parts, per 100 parts of the epoxy resin component.

Embodiment 36 is the adhesive film of any of the preceding embodiments wherein the amine-containing catalyst of the thermally curable, one-part epoxy/thiol resin composition is present in the thermally curable, one-part epoxy/thiol resin composition in an amount of up to 45 parts, up to 40 parts, up to 35 parts, up to 30 parts, up to 25 parts, or up to 20 parts, per 100 parts of the epoxy resin component.

Embodiment 37 is the adhesive film of any of the preceding embodiments, wherein the organic acid is selected from 4-nitroguaiacol, 3,4,5-trimethoxy benzoic acid, hexachlorophene, 4,5,7-trihydroxyflavanone, phloroglucinol, fumaric acid, 3,4-dihydroxy benzoic acid, 3,4,5-trihydroxy benzoic acid, 6-hydroxy-2,5,7,8-tetramethylchroman-2 carboxylic acid, pamoic acid, ascorbic acid, citric acid, 3,4-dihydroxy cinnamic acid, 2,3-dicyanohydroquinone, barbituric acid, a barbituric acid derivative, tetrahydroxy-p-benzoquinone, parabanic acid, phenyl boronic acid, 5-phenyl Meldrum's acid, Meldrum's acid, and combinations thereof.

Embodiment 38 is the adhesive film of embodiment 37 wherein the organic acid is a barbituric acid derivative.

Embodiment 39 is the adhesive film of embodiment 38 wherein the barbituric acid derivative is a barbituric acid compound substituted at one or more of the 1, 3, and/or 5 N positions with an aliphatic, cycloaliphatic, or aromatic group.

Embodiment 40 is the adhesive film of embodiment 39 wherein the barbituric acid derivative is of the Formula (II):

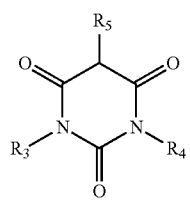

wherein one or more of the $R^3$, $R^4$, and $R^5$ groups are represented by hydrogen, an aliphatic group, a cycloaliphatic group, or an aromatic group (e.g., phenyl), optionally further substituted in any position with one or more of (C1-C4)alkyl, —OH, halide (F, Br, Cl, I), phenyl, (C1-C4)alkylphenyl, (C1-C4)alkenylphenyl, nitro, or —OR$^6$ where $R^6$ is phenyl, a carboxylic group, a carbonyl group, or an aromatic group and $R^6$ is optionally substituted with (C1-C4)alkyl, —OH, or halide; and further wherein at least one of the $R^3$, $R^4$, and $R^5$ groups is not hydrogen. In certain embodiments, at least two of the $R^3$, $R^4$, and $R^5$ groups are not hydrogen.

Embodiment 41 is the adhesive film of embodiment 40 wherein the barbituric acid derivative is selected from 1-benzyl-5-phenylbarbituric acid, 1-cyclohexyl-5-ethylbarbituric acid, 1,3-dimethylbarbituric acid, and a combination thereof.

Embodiment 42 is the adhesive film of any of the preceding embodiments wherein the organic acid is present in the thermally curable, one-part epoxy/thiol resin composition in an amount of at least 0.02 wt-%, or at least 0.03 wt-%, based on the total weight of the adhesive film.

Embodiment 43 is the adhesive film of any of the preceding embodiments wherein the organic acid is present in the thermally curable, one-part epoxy/thiol resin composition in an amount of up to 1.0 wt-%, or up to 0.5 wt-%, based on the total weight of the adhesive film.

Embodiment 44 is the adhesive film of any of the preceding embodiments wherein the thermally curable, one-part epoxy/thiol resin composition within the crosslinked (meth)acrylate matrix is stable at room temperature for a period of at least 2 weeks, at least 4 weeks, or at least 2 months.

Embodiment 45 is an adhesive tape comprising a liner and a thermally curable adhesive film of any of the preceding claims disposed thereon.

Embodiment 46 is the adhesive tape of embodiment 45 comprising two liners with the thermally curable adhesive film disposed therebetween.

Embodiment 47 is the adhesive tape of embodiment 46 wherein one of the two liners has a peel strength of no greater than 10 grams/25 mm, and one of the two liners has a peel strength of at least 30 grams/25 mm.

Embodiment 48 is the adhesive tape of embodiment 47 wherein one of the two liners has a peel strength of 1 gram/25 mm to 10 grams/25 mm, and one of the two liners has a peel strength of 30 grams/25 mm to 50 grams/25 mm.

Embodiment 49 is a method of making an adhesive tape comprising a thermally curable adhesive film of any of embodiments 1 through 45, the method comprising: forming a coatable composition by combining components comprising: a (meth)acrylate resin component comprising (meth)acrylate monomers and/or oligomers, and a photoinitiator; an epoxy resin component comprising an epoxy resin having at least two epoxide groups per molecule; a thiol component comprising a polythiol compound having at least two thiol groups; a nitrogen-containing catalyst for the epoxy resin; and an organic acid; coating the coatable composition on a liner to form a photocurable coating; and photocuring the photocurable coating to form a thermally curable adhesive film disposed on the liner, wherein the thermally curable adhesive film comprises a crosslinked (meth)acrylate matrix having a thermally curable, one-part epoxy/thiol resin composition incorporated therein.

Embodiment 50 is the method of embodiment 49 wherein the photocuring occurs within a period of time of up to 24 hours after forming a coatable composition.

Embodiment 51 is the method of embodiment 49 or 50 wherein photocuring the photocurable coating comprises exposing the photocurable coating 350 nm to 400 nm light with a total dose of 1000 mJ/cm$^2$ to 2400 mJ/cm$^2$ to form the crosslinked (meth)acrylate matrix.

Embodiment 52 is the method of any of embodiments 49 through 51 wherein the combining step comprises adding the organic acid prior to adding the nitrogen-containing catalyst.

Examples

Objects and advantages of this disclosure are further illustrated by the following comparative and illustrative examples. Unless otherwise noted, all parts, percentages, ratios, etc. in the examples and the rest of the specification are by weight, and all reagents used in the examples were obtained, or are available, from general chemical suppliers such as, for example, Sigma-Aldrich Corp., Saint Louis, MO, US.

TABLE 1

Materials

| Material | Description | Source |
| --- | --- | --- |
| YL 980 | Bisphenol A diglycidyl ether based liquid epoxy resin | Mitsubishi Chemical, US |
| EPON 1001 | Solid Bisphenol A based epoxy resin | Hexion Inc., Columbus, OH |
| EPON 828 | A difunctional bis-phenol A/epichlorohydrin derived liquid epoxy resin having an equivalent weight of 185-192 grams/equivalent | Hexion Inc., Columbus, OH |
| MX 257 | Dispersion of polybutadiene base core shell rubber (37%) in liquid bisphenol A diglycidyl ether based epoxy resin (63%) available under the tradename KANE ACE MX-257 | Kaneka Fine Chemicals, Japan |
| 8402 | Aliphatic urethane acrylate oligomer available under the tradename EBECRYL 8402 | Allnex, Belgium |

TABLE 1-continued

Materials

| Material | Description | Source |
| --- | --- | --- |
| CN1964 | Urethane dimethacrylate resin | Sartomer, US |
| TPOL | Liquid phosphine oxide based photoinitiator | BASF, US |
| A187 | Epoxy functional silane coupling agent available under the tradename SILQUEST A-187 | Momentive Performance Materials, US |
| PETMP | Pentaerythritol tetramercaptoproprionate available under the tradename THIOCURE PETMP | BRUNO BOCK Thiochemicals, Germany |
| TMPMP | A multifunctional thiol, trimethylolpropane tris(3-mercaptopropionate) available under the tradename THIOCURE TMPMP | Evans Chematics, Waterloo, NY |
| FXR 1081 | Solid epoxy amine adduct available under the tradename FUJICURE FXR 1081 | T&K Toka Co. Ltd., Japan |
| FA | Fumaric Acid | Sigma Aldrich Chemical Co., St. Louis, MO |
| CA | Cinnamic Acid or 3,4-Dihydroxycinnamic acid | Sigma Aldrich Chemical Co., St. Louis, MO |
| BA | Barbituric Acid | Sigma Aldrich Chemical Co., St. Louis, MO |
| BP | 1-Benzyl-5-phenyl barbituric acid (a barbituric acid derivative) | Chemische Fabrik Berg GmbH, Germany |
| 1,3-dimethyl-barbituric acid | A substituted barbituric acid derivative having a molecular weight of 156.1 | Alfa Aesar, Tewksbury, MA |
| 1-cyclohexyl-5-ethylbarbituric acid | A substituted barbituric acid derivative having a molecular weight of 238.6 | Chemische Fabrik Berg GmbH, Bitterfeld-Wolfen, Germany |

Solubility Test Method

Solubility was evaluated by means of optical transmission and clarity using a BYK GARDNER HAZE-GARD PLUS (BYK Gardner, Silver Spring, Maryland). The instrument was referenced against air during the measurements. For transmission and clarity measurements of the uncured resins, a Teflon spacer was mounted between two clean glass microscope slides, having an average thickness of 0.039 inch (0.99 mm), such that the spacer was outside the optical measurement area and created a gap of approximately 0.072 inch (1.83 mm) into which individual samples of organic acid-containing resins were placed. Clamps, also mounted outside the measurement area, were used to hold the glass pieces tightly to the spacer and ensure that the gap spacing was restricted to the thickness of the spacer. Five individual measurements of the transmission, haze, and clarity were taken on each of the liquid resin samples. The average percent transmission and clarity were reported. For clarity it is desirable to have values of 80%, 85%, 90% or even 95% or higher. For transmission it is desirable to have values of 80%, 85%, or even 90% or higher.

Solubility Evaluation

Examples 1-3 and Comparative Examples 1 and 2 (CE1 and CE2) were prepared using the materials and amounts (in parts by weight) shown in Table 2 and the following procedure. The materials were added to a MAX 60 SPEED-MIXER cup (Flacktek Incorporated, Landrum, SC) and mixed at 2,250 revolutions per minute (rpm) for 30 seconds using a DAC 600 FVZ SPEEDMIXER (FlackTek Incorporated, Landrum, SC), followed by heating for 20 seconds in a 1,000-Watt commercial microwave oven. Next, the sample was remixed in the DAC 600 FVZ SPEEDMIXER for two minutes at 2,250 rpm, and degassed using a DAC 600.2 VAC-P SPEEDMIXER (FlackTek Incorporated, Landrum, SC). The degassing cycle was as follows: 1) mix sample for 20 seconds at 1,000 rpm at atmospheric pressure; 2) mix sample for two minutes at 1,500 rpm while drawing a vacuum down to a final pressure of 30 Torr; and 3) mix sample for 20 seconds at 1,000 rpm while venting to atmospheric pressure. The resulting sample was evaluated for transmittance and clarity as described in the Solubility Test Method above. The results are shown in Table 2 below. In addition, the samples were evaluated by unaided eye for the presence of insoluble material.

TABLE 2

Resin Compositions and Solubility

| Material | Example 1 | Example 2 | Example 3 | CE 1 | CE 2 | Control |
| --- | --- | --- | --- | --- | --- | --- |
| EPON 828 | 47.5 | 47.5 | 47.5 | 47.5 | 50 | None |
| TMPMP | 47.5 | 47.5 | 47.5 | 47.5 | 50 | None |
| 1,3-Dimethyl-barbituric acid | 5 | None | None | None | None | None |
| 1-Cyclohexyl-5-ethyl-barbituric acid | None | 5 | None | None | None | None |
| BP | None | None | 5 | None | None | None |
| BA | None | None | None | 5 | None | None |
| Transmission (%) | 91.7 | 92.5 | 92.3 | 39.0 | 92.4 | 86.0 |
| Clarity (%) | 99.7 | 99.7 | 99.6 | 69.7 | 99.7 | 99.7 |
| Visible Insoluble Material | No | No | No | Yes | No | NA |

*Control was a measurement of the two glass plates with TEFLON spacer between them.
NA: Not applicable High transmission and clarity values are indicative of a homogeneous solution with no insoluble components. The results in Table 2 indicate the substituted barbituric acid derivatives were soluble in the resin compositions shown at levels as high as 5 wt-%. In comparison, the unsubstituted barbituric acid sample exhibited significantly lower transmission and clarity, in addition to containing visibly insoluble material.

Adhesive Film Preparation and Evaluation

The materials and amounts (all in parts by weight) for preparation of Examples 4-11 and Comparative Examples 3-6 (CE3-CE6) are provided in Table 3.

TABLE 3

Formulations of Exemplary and Comparative Adhesives

| Ex | YL980 | EPON 1001 | MX 257 | 8402 | CN 1964 | TPOL | A187 | PETMP | FXR 1081 | BP | FA | CA | BA |
| --- | --- | --- | --- | --- | --- | --- | --- | --- | --- | --- | --- | --- | --- |
| CE3 | | | | 6.87 | | | | | 6.38 | | | | |
| CE4 | | | | 6.87 | | | | | 6.38 | 0.6 | | | |
| CE5 | 6.06 | 3.26 | 4.57 | 6.87 | | .174 | .137 | | 6.38 | .6 | | | |
| CE6 | 6.06 | 3.26 | 4.57 | 5.15 | 1.72 | .174 | .137 | | 6.38 | .6 | | | |

TABLE 3-continued

Formulations of Exemplary and Comparative Adhesives

| Ex | YL980 | EPON 1001 | MX 257 | CN 8402 | 1964 | TPOL | A187 | PETMP | FXR 1081 | BP | FA | CA | BA |
|---|---|---|---|---|---|---|---|---|---|---|---|---|---|
| 4 | 6.06 | 3.26 | 4.57 | 6.87 | | .174 | .137 | 6.38 | .6 | .072 | | | |
| 5 | 6.06 | 3.26 | 4.57 | 5.15 | 1.72 | .174 | .137 | 6.38 | .6 | .034 | | | |
| 6 | 6.06 | 3.26 | 4.57 | 5.15 | 1.72 | .174 | .137 | 6.38 | .6 | .017 | | | |
| 7 | 6.06 | 3.26 | 4.57 | 5.15 | 1.72 | .174 | .137 | 6.38 | .6 | .0067 | | | |
| 8 | 6.06 | 3.26 | 4.57 | 5.15 | 1.72 | .174 | .137 | 6.38 | .6 | | .28 | | |
| 9 | 6.06 | 3.26 | 4.57 | 5.15 | 1.72 | .174 | .137 | 6.38 | .6 | | | .28 | |
| 10 | 6.06 | 3.26 | 4.57 | 5.15 | 1.72 | .174 | .137 | 6.38 | .6 | | | | .28 |
| 11 | 6.06 | 3.26 | 4.57 | 5.15 | 1.72 | .174 | .137 | 6.38 | .6 | .028 | | | |

Comparative Examples CE3-CE5 were prepared by combining the materials in a DAC cup and mixing in a Dual Asymmetric Centrifugal (DAC) mixer (Speedmixer DAC 600.2 VAC-P, from Flack Tek, Inc.).

Initial viscosity was measured using TA Instruments Discovery HR-3 hybrid rheometer with a cone and plate configuration, and the mixture was left to stand overnight at ambient conditions to check for stability. For Comparative Example CE3 there was no change in viscosity after standing for 24 hours. For Comparative Examples CE4 and CE5 after 24 hours at room temperature the mixture formed a soft gel, so viscosity could not be measured. These examples demonstrate that the thiol+acrylate mixture is not stable at room temperature in the presence of the solid amine/epoxy adduct. While not being bound by theory, a Michael addition reaction may be occurring in the dark at room temperature between the thiol and acrylate (catalyzed by the weakly basic nature of the solid amine/epoxy adduct), causing the observed gel formation.

Comparative Examples CE5 and CE6 were mixed, degassed, and several samples of each mixture were coated between polyester film release liners at 6 mils (150 micrometers) thickness at various times after mixing and degassing. The release liners were chosen such that one liner had a silicone-based coating designed for very low peel force (easy side peel or premium release example is T RF02N PET film from SKC Haas Display Films Inc.) of a subsequently applied PSA coating. The other liner was designed by the manufacturer to give a higher peel force (tight-side liner for example T RF 12 N PET film from SKC Hass Display Films Inc.) of a subsequently applied PSA coating. Each film was UV cured under low intensity lamps with a dose of 2400 mJ/cm$^2$. Liner release was measured using a 180-degree peel test on an IMASS SP2100 following ASTM D3330 (2010) test method for both liners as a function of time after mixing and degassing.

Results in Table 4 show that liner release is not stable as the adhesive formulation ages. There is a loss of green strength in the adhesive after UV cure and an increase in tackiness, which leads to problems removing both liners so the adhesive can be used. This result is consistent with the increase in viscosity caused by thiol+acrylate Michael addition, which then leads to poor response to UV cure as the acrylate groups have already reacted with the thiol.

TABLE 4

Release Liner Peel Force as a Function of Aging of Comparative Examples

| Example | Aging Time (hours) | Easy Side Peel Force | Tight Side Peel Force |
|---|---|---|---|
| CE5 | 0 | 9 g/in | 21 g/in |
| CE5 | 4 | 11 g/in | 52 g/in |
| CE5 | 8 | 12.3 g/in | No release/cohesive failure |
| CE6 | 0 | 9 g/in | 26 g/in |
| CE6 | 4 | 12 g/in | 45 g/in |
| CE6 | 8 | 13 g/in | No release/cohesive failure |

Example 4 was mixed and degassed and evaluated for stability like Comparative Examples CE3-CE6. As shown in Table 5, the viscosity was stable for at least 8 hours and liner release, measured from UV cured films of Example 4, was also stable for 8 hours. These results demonstrate that addition of the barbituric acid derivative was able to inhibit the reaction between thiol and acrylate groups that leads to viscosity increase and reduction in green strength after UV cure. UV cured films made from Example 4 were also tested for low temperature cure capability by running an isothermal DSC experiment at 65° C. for one hour. It was found that there was no exotherm observed.

Examples 5, 6, and 7 were prepared with various levels of barbituric acid derivative to determine the effect on low temperature cure capability of the adhesive film. The data in Table 5 show that at surprisingly low levels, the barbituric acid derivative is able to stabilize the coating mixture as evidenced by stable viscosity and stable liner peel results. In addition, cure time at 65° C. is unaffected by the low level of barbituric acid derivative in Example 7. Overlap shear testing (ASTM D1002 (2010)) on aluminum substrates was also performed using the 6 mil (150 microns) adhesive film formed using Example 7 formulation and a thermal cure of 60 minutes at 70° C. and showed 22 MPa shear strength with cohesive failure.

TABLE 5

Release Liner Peel Force as a Function of Adhesive Formulation Aging and DSC Test Results

| Example | Aging Time (hours) | Easy Side Peel | Tight Side Peel | DSC cure time at 65° C. | DSC exotherm onset | DSC exotherm peak |
|---|---|---|---|---|---|---|
| 4 | 0 | 7.7 | 75 | Greater than 60 min | 98° C. | 113.4° C. |
| 4 | 8 | 8.2 | 80 | | | |
| 5 | 0 | 3.4 | 40 | Greater than 60 min | 90.2° C. | 104.7° C. |
| 5 | 8 | 3.3 | 38 | | | |
| 6 | 0 | 3.4 | 36 | 48 min | 87.2° C. | 101.4° C. |
| 6 | 8 | 3.3 | 38 | | | |
| 7 | 0 | 3.9 | 35 | 33 min | 85° C. | 100° C. |
| 7 | 8 | 4.0 | 38 | | | |

Examples 8, 9, 10, 11, and CE6 were mixed and degassed as in the previous examples and then viscosity was measured as a function of aging time. The results in Table 6 show that CE6 shows an increase in viscosity with time. Examples 8, 9, 10, and 11 all show stable viscosity. For Examples 8, 9, and 10 the acid added to stabilize the formulation was insoluble, and for Example 11 the barbituric acid derivative was soluble in the formulation.

TABLE 6

| | Viscosity Initial | Pa · sec +4 hrs | Pa · sec +8 hrs | Pa · sec 24 hours |
|---|---|---|---|---|
| CE6 | 19 | 21 | 23 | 135 |
| 11 | 23.4 | 23.5 | 23.5 | 25 |
| 8 | 20.5 | 21.2 | 21 | 21.3 |
| 9 | 20.4 | 20.4 | 20.9 | 22.5 |
| 10 | 19.5 | 19.3 | 19.2 | 19 |

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed:

1. A thermally curable adhesive film comprising:
   a crosslinked (meth)acrylate matrix; and
   a thermally curable, one-part epoxy/thiol resin composition incorporated within the crosslinked (meth)acrylate matrix; wherein the thermally curable, one-part epoxy/thiol resin composition comprises:
      an epoxy resin component comprising an epoxy resin having at least two epoxide groups per molecule;
      a thiol component comprising a polythiol compound having at least two thiol groups;
      a nitrogen-containing catalyst for the epoxy resin; and
      an organic acid, the organic acid being soluble in the epoxy/thiol resin composition, wherein soluble in the epoxy/thiol resin composition means when the organic acid is incorporated in the epoxy/thiol resin in an amount of 5 wt-%, it produces an epoxy/thiol resin composition with at least 80% clarity and at least 80% transmission.

2. The adhesive film of claim 1 wherein the crosslinked (meth)acrylate matrix is present in an amount of 15 wt-% to 50 wt-%, based on the total weight of the adhesive film.

3. The adhesive film of claim 1, wherein the epoxy resin comprises a polyglycidyl ether of a polyhydric phenol, a reaction product of a polyhydric alcohol with epichlorohydrin, an epoxidised (poly)olefinic resin, an epoxidised phenolic novolac resin, an epoxidised cresol novolac resin, a cycloaliphatic epoxy resin, a glycidyl ether ester, a polyglycidyl ester, a urethane-modified epoxy resin, or a combination of two or more thereof.

4. The adhesive film of claim 1, wherein the epoxy resin component is present in an amount of 15 wt-% to 60 wt-%, based on the total weight of the adhesive film.

5. The adhesive film of claim 1, wherein the thiol component comprises a polythiol compound having at least two primary and/or secondary thiol groups.

6. The adhesive film of claim 5 wherein the polythiol compound comprises trimethylolpropane tris(beta-mercaptopropionate), trimethylolpropane tris(thioglycolate), pentaerythritol tetrakis(thioglycolate), pentaerythritol tetrakis(beta-mercaptopropionate), dipentaerythritol poly(beta-mercaptopropionate), ethylene glycol bis(beta-mercaptopropionate), a (C1-C12) alkyl polythiol, a (C6-C12) aromatic polythiol, or a combination of two or more thereof.

7. The adhesive film of any claim 1, wherein the thiol component is present in an amount of 10 wt-% to 40 wt-%, based on the total weight of the adhesive film.

8. The adhesive film of claim 1, wherein the nitrogen-containing catalyst is solid at room temperature.

9. The adhesive film of claim 1, wherein the nitrogen-containing catalyst is capable of activation at temperatures at or above 50° C. to effect the thermal curing of the epoxy resin.

10. The adhesive film of claim 1, wherein the nitrogen-containing catalyst is an amine-containing catalyst.

11. The adhesive film of claim 10, wherein the amine-containing catalyst is present in an amount of 1 part to 45 parts per 100 parts of the epoxy resin component.

12. The adhesive film of claim 1 wherein the organic acid is a barbituric acid derivative.

13. The adhesive film of claim 12 wherein the barbituric acid derivative is of the Formula (II):

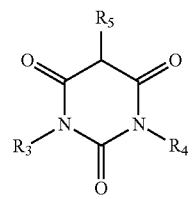

wherein one or more of the $R^3$, $R^4$, and $R^5$ groups are represented by hydrogen, an aliphatic group, a cycloaliphatic group, or an aromatic group (e.g., phenyl), optionally further substituted in any position with one or more of (C1-C4) alkyl, —OH, halide (F, Br, Cl, I), phenyl, (C1-C4) alkylphenyl, (C1-C4) alkenylphenyl, nitro, or —$OR^6$ where $R^6$ is phenyl, a carboxylic group, a carbonyl group, or an aromatic group and $R^6$ is optionally substituted with (C1-C4) alkyl, —OH, or halide; and further wherein at least one of the $R^3$, $R^4$, and $R^5$ groups is not hydrogen.

14. The adhesive film of claim 13 wherein the barbituric acid derivative is selected from 1-benzyl-5-phenylbarbituric acid, 1-cyclohexyl-5-ethylbarbituric acid, 1,3-dimethylbarbituric acid, and a combination thereof.

15. The adhesive film of claim 1, wherein the organic acid is present in the thermally curable, one-part epoxy/thiol resin compositions in an amount of 0.02 wt-% to 1.0 wt-%, based on the total weight of the adhesive film.

16. The adhesive film of claim 1, wherein the thermally curable, one-part epoxy/thiol resin composition within the crosslinked (meth)acrylate matrix is stable at room temperature for a period of at least 2 weeks.

17. An adhesive tape comprising a liner and a thermally curable adhesive film of claim 1 disposed thereon.

* * * * *

UNITED STATES PATENT AND TRADEMARK OFFICE
CERTIFICATE OF CORRECTION

PATENT NO. : 11,884,850 B2
APPLICATION NO. : 16/643606
DATED : January 30, 2024
INVENTOR(S) : Eric George Larson It is certified that error appears in the above-identified patent and that said Letters Patent is hereby corrected as shown below:

In the Claims

Column 28

Line 60, In Claim 13, delete "$R^3$, $R^4$, and $R^5$" and insert -- $R_3$, $R_4$, and $R_5$ --, therefor.

Line 66, In Claim 13, delete "-$OR^6$ where $R^6$" and insert -- -$OR_6$ where $R_6$ --, therefor.

Line 67, In Claim 13, delete "$R^6$" and insert -- $R_6$ --, therefor.

Column 29

Line 2, In Claim 13, delete "$R^3$, $R^4$," and insert -- $R_3$, $R_4$, --, therefor.

Line 3, In Claim 13, delete "$R^5$" and insert -- $R_5$ --, therefor.

Signed and Sealed this
Twentieth Day of August, 2024

Katherine Kelly Vidal
*Director of the United States Patent and Trademark Office*